(12) United States Patent
McFadyen

(10) Patent No.: US 8,300,338 B1
(45) Date of Patent: Oct. 30, 2012

(54) DISK DRIVE CORRELATING DIFFERENT FLY HEIGHT MEASUREMENTS TO VERIFY DISK WARPAGE

(75) Inventor: James P. R. McFadyen, Redwood City, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 118 days.

(21) Appl. No.: 12/895,115

(22) Filed: Sep. 30, 2010

(51) Int. Cl.
*G11B 27/36* (2006.01)
*G11B 21/02* (2006.01)

(52) U.S. Cl. .......................... 360/31; 360/75
(58) Field of Classification Search .................. None
See application file for complete search history.

(56) References Cited

U.S. PATENT DOCUMENTS

| | | |
|---|---|---|
| 4,775,902 A | 10/1988 | Trovato et al. |
| 4,777,544 A | 10/1988 | Brown et al. |
| 4,804,894 A | 2/1989 | Machida et al. |
| 4,839,754 A | 6/1989 | Gami et al. |
| 5,130,866 A | 7/1992 | Klaassen et al. |
| 5,168,413 A | 12/1992 | Coker et al. |
| 5,377,058 A | 12/1994 | Good et al. |
| 5,594,595 A | 1/1997 | Zhu |
| 5,742,446 A | 4/1998 | Tian et al. |
| 5,909,330 A | 6/1999 | Carlson et al. |
| 5,949,605 A | 9/1999 | Lee et al. |
| 6,008,640 A | 12/1999 | Tan et al. |
| 6,052,243 A | 4/2000 | Shimada |
| 6,097,559 A | 8/2000 | Ottesen et al. |
| 6,104,687 A | 8/2000 | Lee et al. |
| 6,125,008 A | 9/2000 | Berg et al. |
| 6,175,456 B1 | 1/2001 | Yun |
| 6,178,157 B1 | 1/2001 | Berg et al. |
| 6,191,901 B1 | 2/2001 | Carlson et al. |
| 6,268,976 B1 | 7/2001 | Carlson et al. |
| 6,288,856 B1 | 9/2001 | Ottesen et al. |
| 6,310,740 B1 | 10/2001 | Dunbar et al. |
| 6,417,981 B1 | 7/2002 | Smith |
| 6,452,735 B1 | 9/2002 | Egan et al. |
| 6,459,539 B1 | 10/2002 | Carlson et al. |
| 6,493,169 B1 | 12/2002 | Ferris et al. |
| 6,501,606 B2 | 12/2002 | Boutaghou et al. |
| 6,519,102 B1 | 2/2003 | Smith et al. |
| 6,608,727 B2 | 8/2003 | Ottesen et al. |
| 6,611,389 B1 | 8/2003 | Liu et al. |
| 6,624,957 B1 | 9/2003 | Yun |
| 6,671,110 B2 | 12/2003 | Baba et al. |
| 6,671,111 B2 | 12/2003 | Ottesen et al. |
| 6,674,590 B2 | 1/2004 | Ottesen et al. |
| 6,678,108 B2 | 1/2004 | Smith et al. |
| 6,700,724 B2 | 3/2004 | Riddering et al. |
| 6,717,764 B2 | 4/2004 | Lake |

(Continued)

OTHER PUBLICATIONS

Shiramatsu et al., "Dynamically Controlled Thermal Flying-Height Control Slider", IEEE Transactions on Magnetics, vol. 44, Issue 11, Nov. 2008, pp. 3695-3697.

*Primary Examiner* — Regina N Holder

(57) ABSTRACT

A disk drive is disclosed comprising a disk surface, and a head actuated over the disk surface. A first fly height measurement is generated for the head over the disk surface by measuring a first metric, and a second fly height measurement is generated for the head over the disk surface by measuring a second metric different from the first metric. The first fly height measurement is verified by detecting a positive correlation in the first and second fly height measurements.

14 Claims, 5 Drawing Sheets

U.S. PATENT DOCUMENTS

| | | |
|---|---|---|
| 6,735,027 B2 | 5/2004 | Helsel et al. |
| 6,762,899 B2 | 7/2004 | Ottesen et al. |
| 6,765,745 B2 | 7/2004 | Smith et al. |
| 6,785,081 B2 | 8/2004 | Chapin et al. |
| 6,798,605 B2 | 9/2004 | Kurita et al. |
| 6,801,376 B2 | 10/2004 | Smith |
| 6,822,816 B2 | 11/2004 | Dakroub |
| 6,865,040 B2 | 3/2005 | Fayeulle et al. |
| 6,883,368 B2 | 4/2005 | Smith et al. |
| 6,888,694 B2 | 5/2005 | Guo et al. |
| 6,894,854 B1 | 5/2005 | Carlson et al. |
| 6,930,844 B2 | 8/2005 | Yeh et al. |
| 6,950,266 B1 | 9/2005 | McCaslin et al. |
| 6,968,731 B2 | 11/2005 | Hu et al. |
| 6,980,383 B2 | 12/2005 | Brunnett et al. |
| 6,992,853 B2 | 1/2006 | Chang |
| 7,016,131 B2 | 3/2006 | Liu et al. |
| 7,023,647 B2 | 4/2006 | Bloodworth et al. |
| 7,038,875 B2 | 5/2006 | Lou et al. |
| 7,046,463 B2 | 5/2006 | Gay Sam et al. |
| 7,068,449 B2 | 6/2006 | Riddering et al. |
| 7,068,451 B1 | 6/2006 | Wang et al. |
| 7,068,457 B2 | 6/2006 | Riddering et al. |
| 7,092,195 B1 | 8/2006 | Liu et al. |
| 7,095,578 B2 | 8/2006 | Ma |
| 7,158,325 B1 | 1/2007 | Hu et al. |
| 7,180,692 B1 | 2/2007 | Che et al. |
| 7,215,500 B1 | 5/2007 | Albrecht et al. |
| 7,253,984 B1 | 8/2007 | Patapoutian et al. |
| 7,265,933 B1 | 9/2007 | Phan et al. |
| 7,271,975 B2 | 9/2007 | Shimizu et al. |
| 7,324,299 B1 | 1/2008 | Schreck et al. |
| 7,349,170 B1 | 3/2008 | Rudman et al. |
| 7,359,138 B1 | 4/2008 | Albrecht et al. |
| 7,369,340 B1 | 5/2008 | Dang et al. |
| 7,375,914 B1 | 5/2008 | Dieron et al. |
| 7,376,182 B2 | 5/2008 | Kris |
| 7,426,090 B2 | 9/2008 | Yamashita et al. |
| 7,450,333 B2 | 11/2008 | Hirano et al. |
| 7,457,072 B2 | 11/2008 | Dieron et al. |
| 7,508,617 B1 | 3/2009 | Mak et al. |
| 7,583,466 B2 | 9/2009 | Kermiche et al. |
| 7,605,997 B2 | 10/2009 | Yamazaki |
| 7,630,162 B2 | 12/2009 | Zhao et al. |
| 7,675,707 B1 | 3/2010 | Liu et al. |
| 7,729,080 B2 | 6/2010 | Suzuki |
| 7,839,595 B1 | 11/2010 | Chue et al. |
| 7,916,420 B1 * | 3/2011 | McFadyen et al. ............ 360/75 |
| 8,059,357 B1 | 11/2011 | Knigge et al. |
| 2002/0167745 A1 | 11/2002 | Ottesen et al. |
| 2003/0002183 A1 | 1/2003 | Fioravanti |
| 2003/0043491 A1 | 3/2003 | Riddering et al. |
| 2003/0133220 A1 | 7/2003 | Hsin |
| 2003/0184899 A1 | 10/2003 | Gay Sam et al. |
| 2003/0184907 A1 | 10/2003 | Li et al. |
| 2003/0218813 A1 | 11/2003 | Dakroub |
| 2004/0075940 A1 | 4/2004 | Bajorek et al. |
| 2005/0128630 A1 | 6/2005 | Huang et al. |
| 2006/0158769 A1 | 7/2006 | Ono et al. |
| 2006/0268445 A1 | 11/2006 | Brannon et al. |
| 2007/0127148 A1 | 6/2007 | Yokohata et al. |
| 2007/0211368 A1 | 9/2007 | Shibano et al. |
| 2007/0268615 A1 | 11/2007 | McFadyen et al. |
| 2008/0088962 A1 | 4/2008 | Baral |
| 2008/0130159 A1 | 6/2008 | Dieron et al. |
| 2008/0158730 A1 | 7/2008 | Furukawa et al. |
| 2008/0165446 A1 | 7/2008 | Partee |
| 2008/0239547 A1 | 10/2008 | Okamura |
| 2009/0002860 A1 | 1/2009 | Takamatsu et al. |
| 2009/0141390 A1 | 6/2009 | Oyamada et al. |
| 2009/0195912 A1 | 8/2009 | Sato |
| 2011/0043938 A1 * | 2/2011 | Mathew et al. ............ 360/31 |

* cited by examiner

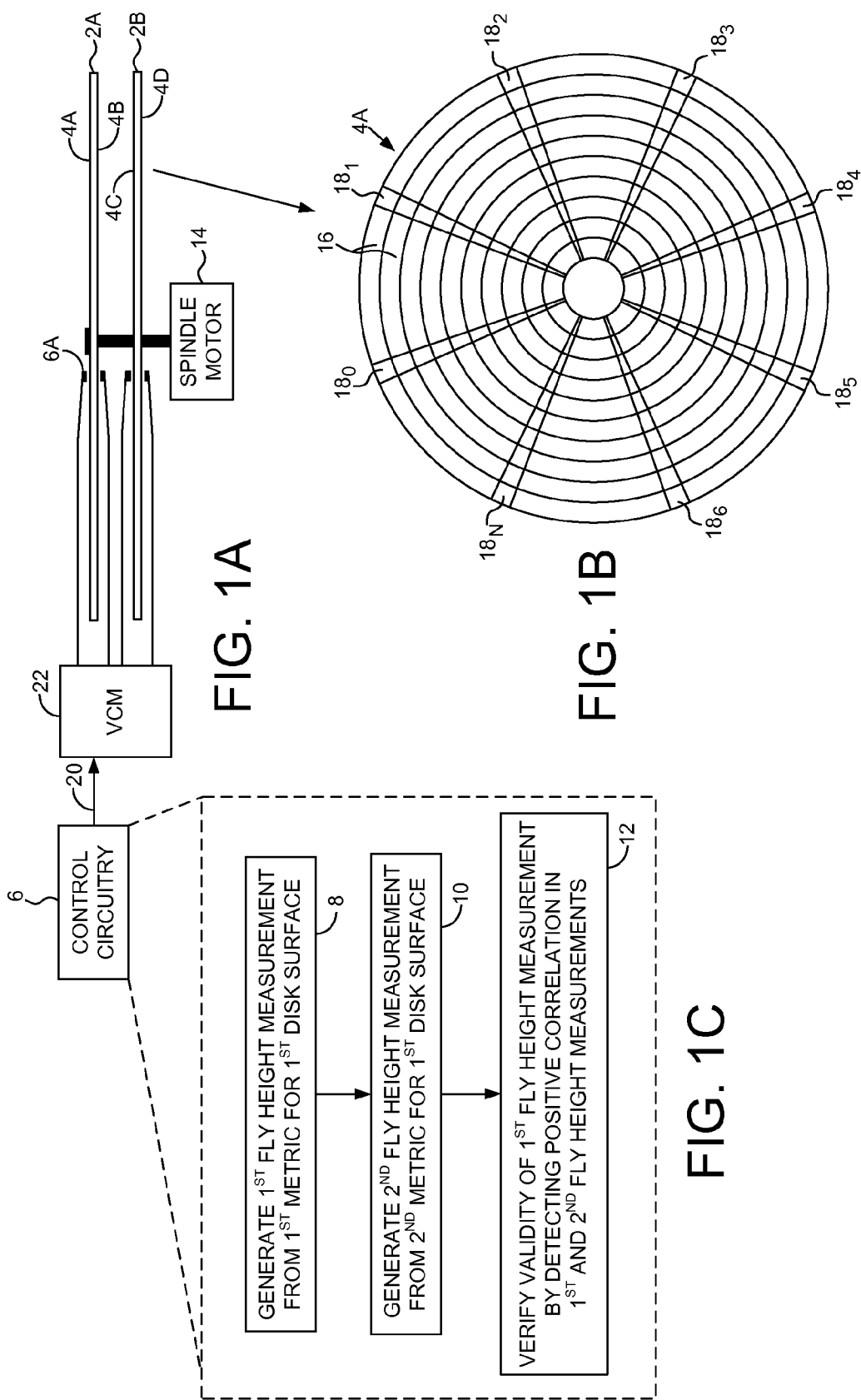

$$\frac{\sum_{i=1}^{n}(x_i - \bar{x})(y_i - \bar{y})}{(n-1)S_x S_y}$$

DISK DRIVE CORRELATING DIFFERENT FLY HEIGHT MEASUREMENTS TO VERIFY DISK WARPAGE

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

An air bearing forms between the head and the disk due to the disk rotating at high speeds. Since the quality of the write/read signal depends on the fly height of the head, conventional heads (e.g., a magnetoresistive heads) may comprise an actuator for controlling the fly height. Any suitable fly height actuator may be employed, such as a heater which controls fly height through thermal expansion, or a piezoelectric (PZT) actuator. It is desirable to determine the appropriate fly height actuator control signal (e.g., appropriate current applied to a heater) that achieves the target fly height for the head.

BRIEF DESCRIPTION OF THE DRAWINGS

FIGS. 1A and 1B show a disk drive comprising a plurality of disk surfaces and a head actuated over each disk surface.

FIG. 1C is a flow diagram according to an embodiment of the present invention wherein a first fly height measurement is verified by detecting a positive correlation with a second fly height measurement.

DETAILED DESCRIPTION OF EMBODIMENTS OF THE INVENTION

FIGS. 1A and 1B show a disk drive according to an embodiment of the present invention comprising a first disk surface 4A, and a first head 6A actuated over the first disk surface 4A. The disk drive further comprises control circuitry 6 operable to execute the flow diagram of FIG. 1C, wherein a first fly height measurement is generated for the first head over the first disk surface by measuring a first metric (step 8), and a second fly height measurement is generated for the first head over the first disk surface by measuring a second metric different from the first metric (step 10). The first fly height measurement is verified by detecting a positive correlation in the first and second fly height measurements (step 12).

In the embodiment of FIG. 1A, the disk drive comprises a plurality of disks (e.g., 2A and 2B) each comprising top and bottom disk surfaces and corresponding heads actuated over each disk surface. A spindle motor 14 rotates the disks about a center axis so that an air bearing forms between the heads and the disk surfaces. Each disk surface (such as the disk surface 4A shown in FIG. 1B) comprises a plurality of data tracks 16 defined by a plurality of servo sectors $18_0$-$18_N$ that comprise suitable head positioning information (such as a track address and servo bursts). The control circuitry 6 demodulates the servo sectors $18_0$-$18_N$ to generate a control signal 20 applied to a voice coil motor (VCM) 22. The VCM 22 rotates an actuator arm about a pivot in order to position a head over a target data track.

One or more of the disks in a disk drive may exhibit warpage due, for example, to a manufacturing defect of the disk itself, or due to stress applied to the disk when it is clamped to the spindle motor. It is desirable to detect disk warpage for various reasons, such as for data collection in order to analyze new designs, or to replace or disable a warped disk during manufacturing, or to map the fly height variations due to the disk warpage and generate feedforward compensation for dynamically adjusting the fly height of the head during normal operation.

The disk warpage may be detected by measuring a fly height of the head around the circumference of a track at a target radial location of the disk. However, the techniques for measuring fly height of the head may be influenced by factors other than the actual fly height of the head. For example, a defect on the disk surface (e.g., a scratch) may induce a false fly height measurement depending on the measurement algorithm employed. An inaccurate fly height measurement may distort the design data, or may lead to unnecessary replacing or disabling of disks, or may create errors during operation when using dynamic fly height control.

Figures 2A, 2B:
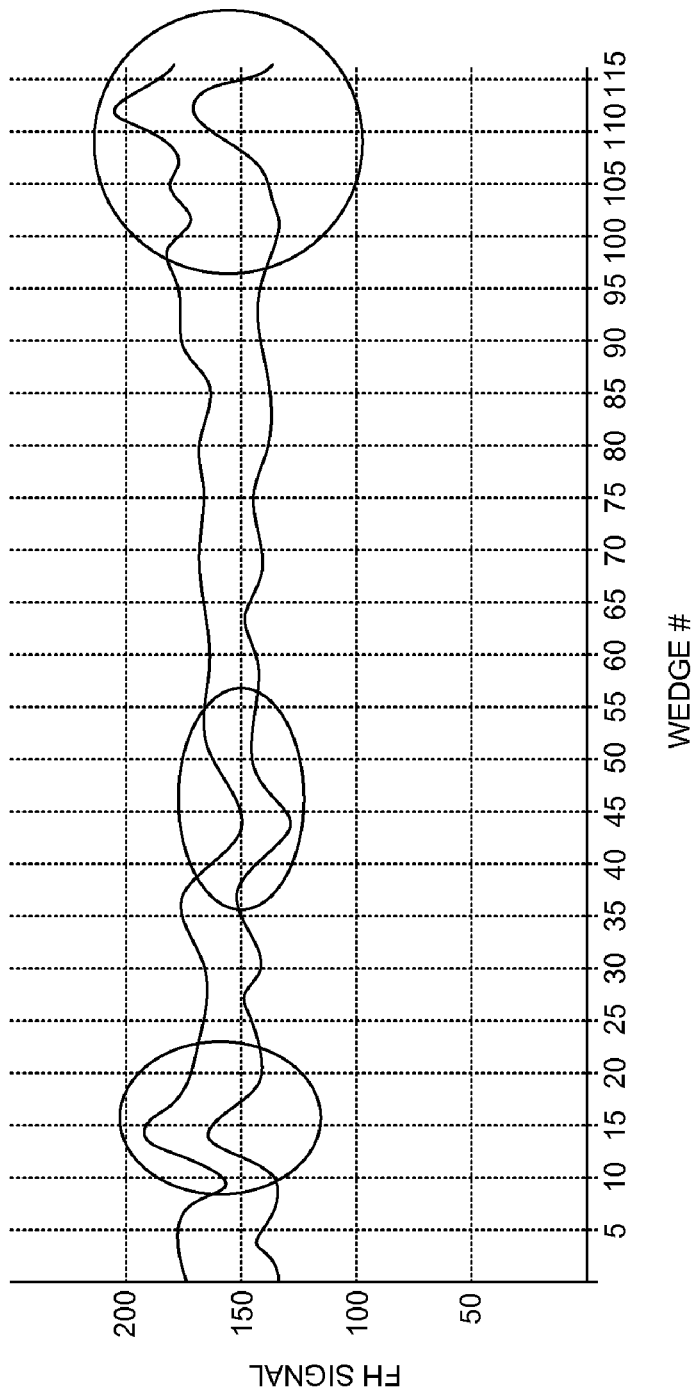
FIGS. 2A and 2B illustrate an embodiment of the present invention wherein a positive correlation occurs between two different fly height measurements taken for the same disk surface.

In embodiments of the present invention, a first fly height measurement generated by measuring a first metric is verified by detecting a positive correlation in a second fly height measurement generated by measuring a second metric different from the first metric. FIG. 2A illustrates an embodiment of the present invention wherein a positive correlation in first and second fly height measurements helps verify that the first fly height measurement is valid. If a positive correlation is absent, any suitable action may be taken, such as taking further fly height measurements by measuring additional metrics until there is sufficient confidence in the fly height measurements.

Any suitable technique may be used to detect a positive correlation in the first and second fly height measurements. FIG. 2B shows a conventional algorithm for computing a correlation between two signals, where $\bar{x}$ and $\bar{y}$ are the sample means of the signals x and y, and Sx and Sy are the sample standard deviations of signals x and y. Any suitable length of sample window (number of samples n) may be selected to compute the correlation using the equation of FIG. 2B. The output of the computed correlation will range from −1 to +1, where −1 indicates a highly negative correlation and +1 indicates a highly positive correlation.

Figure 3A:
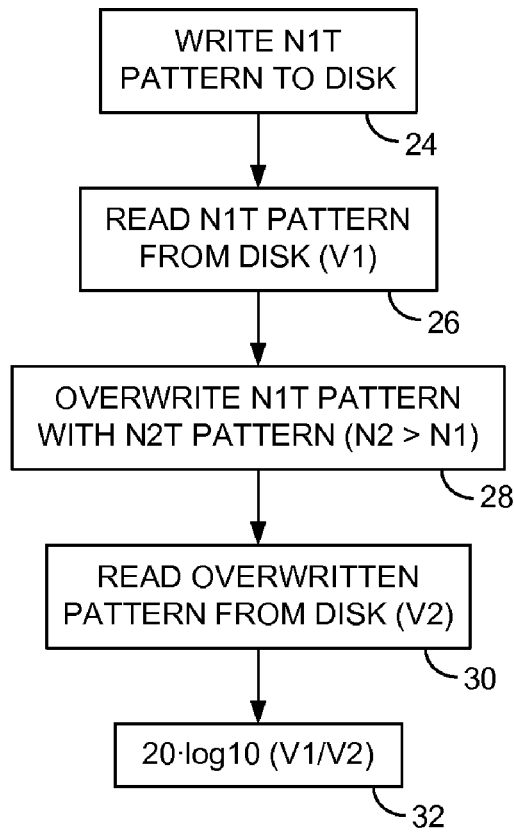
FIG. 3A is a flow diagram according to an embodiment of the present invention wherein a metric of a fly height measurement comprises an overwrite metric.

Any suitable technique may be employed to generate the fly height measurements in the embodiments of the present invention. FIG. 3A is a flow diagram according to an embodiment of the present invention for generating the fly height measurement by measuring an overwrite (OW) metric. A first N1T pattern (e.g., 2T pattern) is written to the disk (step 24) and an amplitude V1 of the read signal measured while reading the pattern (step 26). A second N2T pattern (e.g., 13T pattern) is written over the N1T pattern (step 28) wherein N2T is greater than N1T. An amplitude V2 of the read signal (at frequency 1/N1T) is measured when reading the overwritten pattern from the disk (step 30). The fly height measurement is then generated (step 32) as twenty times the log10 (V1/V2). The equation of FIG. 3B generates units of decibels rather than units of length and therefore in one embodiment the decibel units may be transformed into units of length using any suitable function. In other embodiments, the decibel units may be used directly to detect a correlation with a second fly height measurement having units of length (the units may not matter when computing a correlation).

The OW fly height method of FIG. 3A may provide a suitable fly height measurement for disk drives employing perpendicular recording (wherein the magnetic write field is perpendicular to the disk surface). In another embodiment, a reverse OW fly height method may be employed for disk drives employing longitudinal magnetic recording (where the magnetic write current is in-plane with the disk surface). In the reverse OW fly height method, the frequency of the first N1T pattern is less than the frequency of the second N2T pattern (i.e., N2<N1).

Figure 3B:
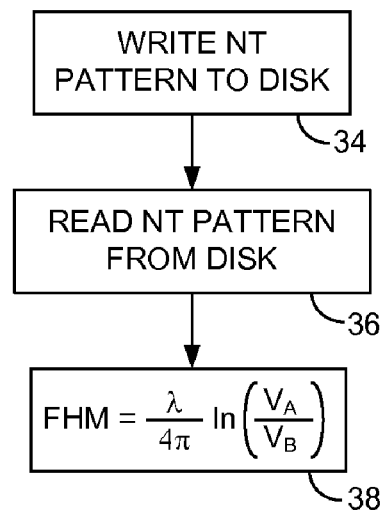
FIG. 3B is a flow diagram according to an embodiment of the present invention wherein a metric of a fly height measurement comprises a harmonic ratio metric.

FIG. 3B shows an embodiment of the present invention wherein the fly height measurement is generated by measuring a harmonic ratio (HR) metric. An NT pattern (e.g., 2T pattern) is written to the disk (step 34), and then read from the disk (step 36). A fly height measurement (FHM) is generated (step 38) by measuring an amplitude of the read signal at a first harmonic ($V_A$) and at a second harmonic ($V_B$). A log of the ratio ($V_A/V_B$) is then multiplied by ($\lambda/4\pi$), where $\lambda$ is the frequency of the NT read signal in the spatial domain (i.e., velocity/write_frequency). In one embodiment, the first harmonic is the fundamental harmonic of the NT read signal, and the second harmonic is the third harmonic of the NT read signal. The NT pattern may be written in the user data area between the servo sectors (FIG. 1B) and the HR fly height measurement generated at any suitable resolution (e.g., once per data sector). In another embodiment, the preamble and/or the servo bursts within the servo sectors and/or the preamble of a data sector may be read to generate the NT read signal for performing the HR fly height measurement.

In one embodiment, the amplitude of the second harmonic may be generated by writing and reading a higher frequency NT pattern and extracting the fundamental frequency from the NT read signal. For example, the amplitude of the first harmonic may be generated by writing and reading a 6T pattern and extracting the fundamental frequency from the 6T read signal, and the second harmonic may be generated by writing and reading a 2T pattern and extracting the fundamental frequency from the 2T read signal.

In one embodiment, an amplitude of the read signal may be evaluated to generate the fly height measurement. For example, the above described HR fly height measurement and OW fly height measurement involve measuring an amplitude of the read signal at specific frequencies (e.g., 2T or 6T frequencies). In another embodiment, the amplitude of the read signal may be input into a Wallace spacing equation to measure the fly height. The amplitude of the read signal may be measured directly by evaluating the read signal in the analog or discrete-time domain before the read signal has been amplified to match a target amplified read signal amplitude, or the amplitude may be measured indirectly by monitoring a read signal value that is indicative of the read signal amplitude. For example, in one embodiment the disk drive comprises a variable gain amplifier (VGA) for amplifying the read signal, and a VGA value, such as the VGA gain setting or the gain error used to generate the VGA gain setting may be evaluated to measure the amplitude of the read signal.

Figure 4A:
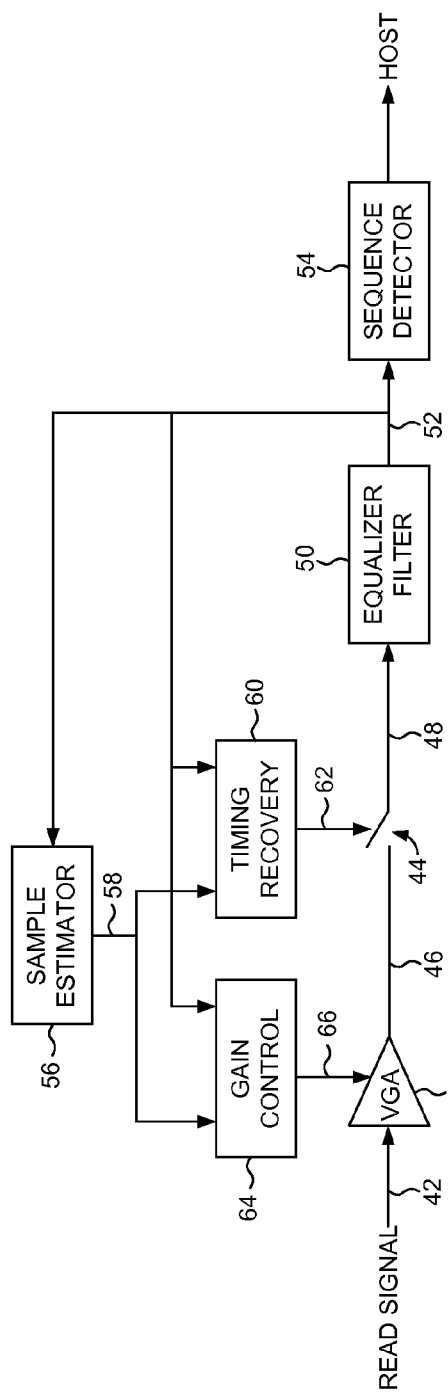
FIG. 4A shows control circuitry according to an embodiment of the present invention comprising a variable gain amplifier (VGA) for adjusting an amplitude of the read signal.

This embodiment is illustrated in FIG. 4A which shows read channel components according to an embodiment of the present invention, including a VGA 40 for amplifying a read signal 42 emanating from a head. The read channel further comprises a sampling device 44 for sampling the amplified read signal 46 to generate a sequence of read signal sample values 48. An equalizing filter 50 shapes the read signal sample values 48 according to a desired response (e.g., a partial response or PR) to generate equalized sample values 52. The equalized sample values 52 are processed by a sequence detector 54 (e.g., a Viterbi detector) to detect an estimated bit sequence representing the data recorded on the disk. The read channel further comprises a sample estimator 56 (e.g., a slicer) for estimating a target sample value 58 from an equalized sample value 52. The target sample value 58 and equalized sample value 52 are processed by timing recovery 60 to synchronize a sampling clock 62 to the baud rate of the data, and processed by gain control 64 to generate a VGA gain setting 66 for adjusting the gain of the VGA 40.

Figure 4B:
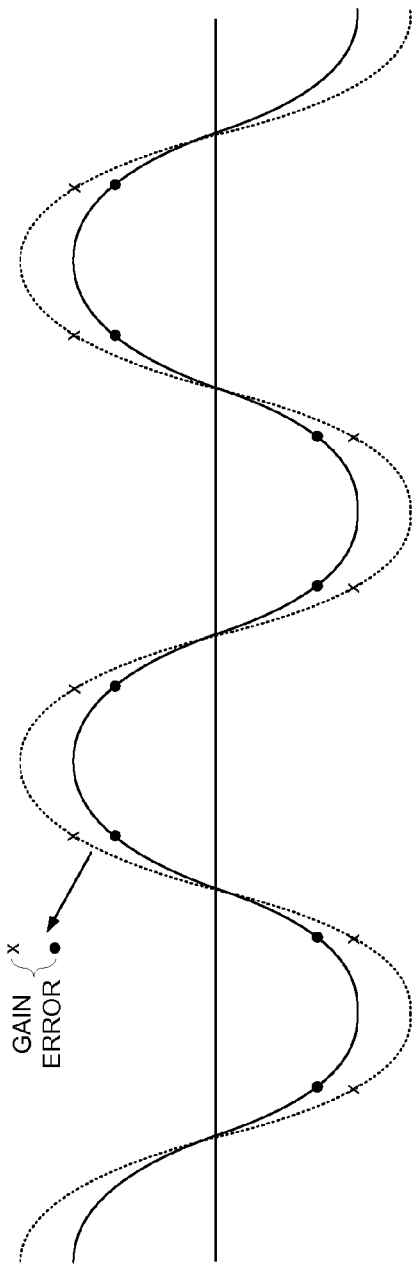
FIG. 4B illustrates an embodiment of the present invention wherein a gain error is generated and used to generate a VGA setting, wherein the VGA setting is indicative of a fly height measurement.

Operation of the gain control 64 is understood with reference to FIG. 4B which shows a substantially sinusoidal read signal generated by reading a 2T pattern. The solid circles represent the measured amplified read signal samples, and the "x"s represent target sample values corresponding to a target amplitude of the amplified read signal. The resulting gain error is used to adjust the gain setting 66 and therefore the gain of the VGA 40. In the example of FIG. 4B, the gain error will increase the gain setting 66 so as to increase the amplitude of the amplified read signal 46 toward the target amplitude. Therefore, the gain error and/or the gain setting 66 may be evaluated to measure the amplitude of the read signal 42 input into the VGA 40, and the resulting amplitude measurement may be transformed into a fly height measurement using any suitable function.

Figure 5:
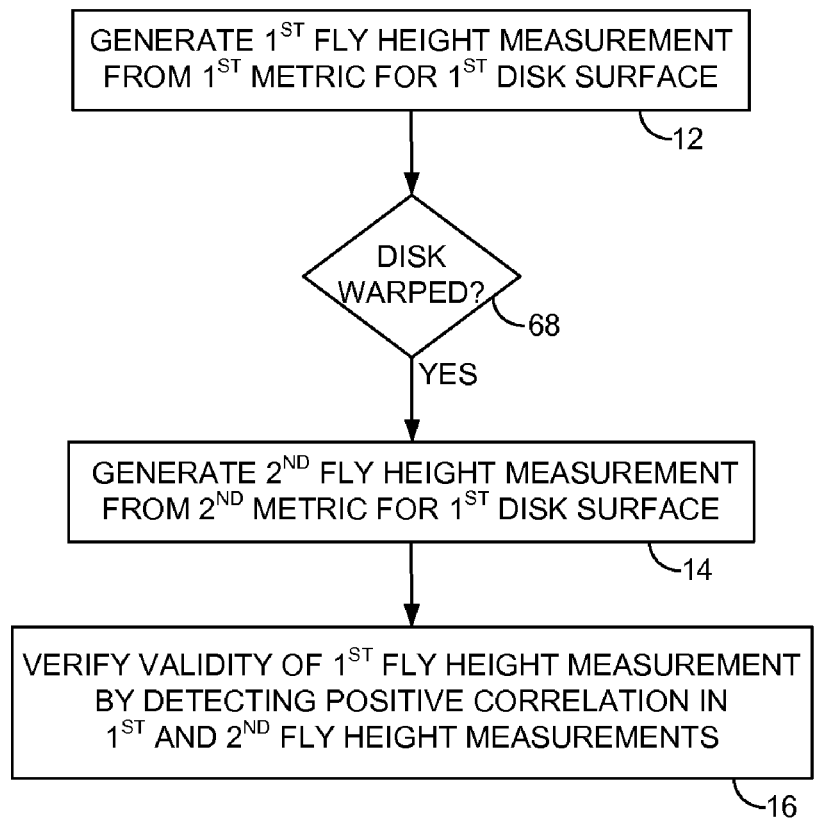
FIG. 5 is a flow diagram according to an embodiment of the present invention wherein a first fly height measurement is verified using a second fly height measurement if the first fly height measurement indicates excessive disk warpage.

FIG. 5 shows a flow diagram according to an embodiment of the present invention that extends on the flow diagram of FIG. 1C, wherein after generating the first fly height measurement (step 12) it is evaluated to determine whether excessive disk warpage is detected (step 68). If excessive disk warpage is detected, the second fly height measurement is generated (step 14) and used to verify the first fly height measurement by detecting a positive correlation in the measurements (step 16). For example, in one embodiment the first fly height measurement may be generated by measuring an overwrite metric described above. If the overwrite fly height measurement indicates excessive disk warpage (e.g., due to exceeding predetermined thresholds), the overwrite fly height measurement may be verified by generating a second fly height measurement (e.g., a harmonic ratio fly height measurement described above) and detecting a positive correlation in the two measurements.

Figure 6:
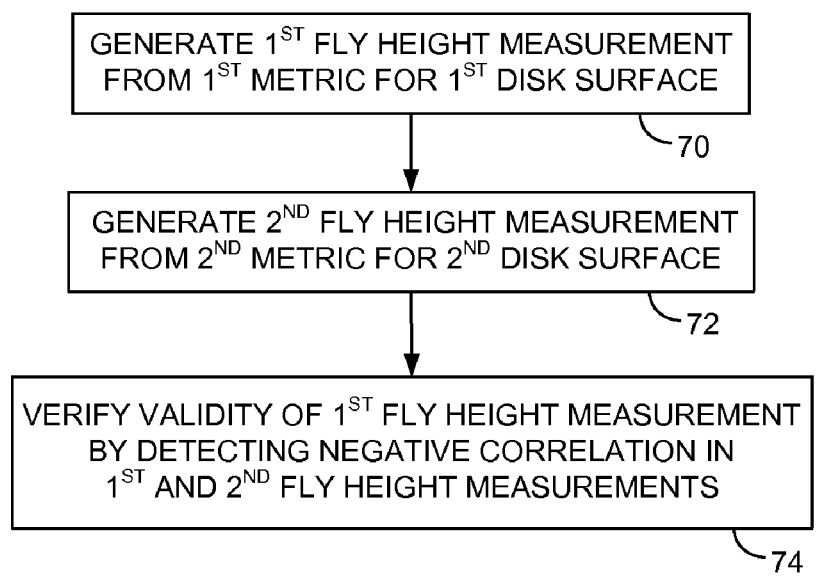
FIG. 6 is a flow diagram according to an embodiment of the present invention wherein a first fly height measurement is verified by detecting a negative correlation with a fly height measurement taken for a second disk surface opposite the first disk surface.

FIG. 6 shows a flow diagram according to an embodiment of the present invention wherein the first fly height measurement may be further verified by detecting a negative correlation with a fly height measurement taken on an opposite disk surface. Accordingly, after generating the first fly height measurement for the first disk surface by measuring a first metric (step 70), a second fly height measurement for a second disk surface opposite the first disk surface is generated by measuring a second metric different from the first metric (step 72). The first fly height measurement is then verified by detecting a negative correlation in the first and second fly height measurements (step 74). The fly height measurements will exhibit a negative correlation because the fly heights of the heads over opposite disk surfaces (e.g., top and bottom) will vary inversely to one another. For example, if the fly height of the head over a top disk surface decreases due to disk warpage, there should be a corresponding increase in the fly height of the head over the bottom disk surface. In one embodiment, the flow diagram of FIG. 6 may be executed if a positive correlation is not detected in two or more fly height measurements generated for the first disk surface.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
a first disk surface;
a first head actuated over the first disk surface; and
control circuitry operable to:
generate a first fly height measurement for the first head over the first disk surface by measuring a first metric;
generate a second fly height measurement for the first head over the first disk surface by measuring a second metric different from the first metric; and
verify the first fly height measurement by detecting a positive correlation in the first and second fly height measurements.

2. The disk drive as recited in claim 1, wherein the first metric comprises an overwrite metric.

3. The disk drive as recited in claim 2, wherein the control circuitry is further operable to:
write a first pattern to a track on the first disk surface at a first frequency;
read the track and measure a first read signal amplitude;
write a second pattern to the track at a second frequency;
read the track to and measure a second read signal amplitude; and
generate the first metric in response to the first and second read signal amplitudes.

4. The disk drive as recited in claim 3, wherein the second metric comprises a harmonic ratio metric.

5. The disk drive as recited in claim 4, wherein the control circuitry is further operable to:
write data to the track;
read the track to generate a read signal;
measure a first amplitude of the read signal at a first harmonic;
measure a second amplitude of the read signal at a second harmonic; and
generate the second metric in response to the first and second amplitudes.

6. The disk drive as recited in claim 3, wherein the second metric comprises a setting for a variable gain amplifier operable to amplify a read signal emanating from the first head while reading data from the track.

7. The disk drive as recited in claim 1, further comprising a second disk surface and a second head actuated over the second disk surface, wherein the control circuitry is further operable to:
generate a third fly height measurement for the second head over the second disk surface opposite the first disk surface by measuring a third metric different from the first metric; and
verify the first fly height measurement by detecting a negative correlation in the first and third fly height measurements.

8. A method of operating a disk drive comprising a first disk surface and a first head actuated over the first disk surface, the method comprising:
generating a first fly height measurement for the first head over the first disk surface by measuring a first metric;
generating a second fly height measurement for the first head over the first disk surface by measuring a second metric different from the first metric; and
verifying the first fly height measurement by detecting a positive correlation in the first and second fly height measurements.

9. The method as recited in claim 8, wherein the first metric comprises an overwrite metric.

10. The method as recited in claim 9, further comprising:
writing a first pattern to a track on the first disk surface at a first frequency;
reading the track and measuring a first read signal amplitude;
writing a second pattern to the track at a second frequency;
reading the track to and measuring a second read signal amplitude; and
generating the first metric in response to the first and second read signal amplitudes.

11. The method as recited in claim 10, wherein the second metric comprises a harmonic ratio metric.

12. The method as recited in claim 11, further comprising:
writing data to the track;
reading the track to generate a read signal;
measuring a first amplitude of the read signal at a first harmonic;
measuring a second amplitude of the read signal at a second harmonic; and
generating the second metric in response to the first and second amplitudes.

13. The method as recited in claim 10, wherein the second metric comprises a setting for a variable gain amplifier operable to amplify a read signal emanating from the first head while reading data from the track.

14. The method as recited in claim 8, further comprising a second disk surface and a second head actuated over the second disk surface, further comprising:
generating a third fly height measurement for the second head over the second disk surface opposite the first disk surface by measuring a third metric different from the first metric; and
verifying the first fly height measurement by detecting a negative correlation in the first and third fly height measurements.

* * * * *